(12) United States Patent
Diessner et al.

(10) Patent No.: US 10,820,501 B2
(45) Date of Patent: Nov. 3, 2020

(54) ARRANGEMENT FOR SWITCHING A COMBINE HARVESTER BETWEEN A SWATH DEPOSIT MODE AND A WIDE DISTRIBUTION MODE

(71) Applicant: Deere & Company, Moline, IL (US)

(72) Inventors: Gregor Diessner, Schweigen-Rechtenbach (DE); Oliver Klein, Saarwellingen (DE); Martin Rittershofer, East Moline, IL (US)

(73) Assignee: Deere & Company, Moline, IL (US)

( * ) Notice: Subject to any disclaimer, the term of this patent is extended or adjusted under 35 U.S.C. 154(b) by 93 days.

(21) Appl. No.: 16/162,436

(22) Filed: Oct. 17, 2018

(65) Prior Publication Data
US 2019/0174674 A1      Jun. 13, 2019

(30) Foreign Application Priority Data
Dec. 11, 2017    (DE) .................. 10 2017 222 409

(51) Int. Cl.
*A01D 41/12*      (2006.01)
*A01F 12/18*      (2006.01)
*A01F 7/06*       (2006.01)

(52) U.S. Cl.
CPC ........ *A01D 41/1243* (2013.01); *A01F 12/181* (2013.01); *A01F 12/184* (2013.01); *A01F 7/067* (2013.01)

(58) Field of Classification Search
CPC . A01D 41/1243; A01F 12/181; A01F 12/184; A01F 7/067
See application file for complete search history.

(56) References Cited

U.S. PATENT DOCUMENTS

| 4,056,107 A | 11/1977 | Todd et al. | |
|---|---|---|---|
| 2005/0101363 A1* | 5/2005 | Farley ................ | A01D 41/1243 460/112 |
| 2008/0305841 A1* | 12/2008 | Overschelde ...... | A01D 41/1243 460/59 |
| 2009/0005137 A1* | 1/2009 | Isaac .................. | A01D 41/1243 460/111 |
| 2009/0156277 A1* | 6/2009 | Benes ................ | A01D 41/1243 460/112 |
| 2009/0253474 A1* | 10/2009 | Isaac .................. | A01D 41/1243 460/111 |
| 2010/0184494 A1* | 7/2010 | Klein ................ | A01D 41/1243 460/112 |

(Continued)

FOREIGN PATENT DOCUMENTS

DE       102008001460 A1    2/2009
EP       3153001 A1         4/2017

*Primary Examiner* — Abigail A Risic

(57) ABSTRACT

An arrangement for switching over a combine harvester between swath deposit operation and wide distribution operation comprises a front element and a rear element which follows downstream. The rear element may be attached in an articulated fashion, in an inherently rigid fashion, at its upstream end about a first pivoting axis and may be moved between a swath deposit position and a wide distribution position by an adjustment drive. The front element may be attached in an articulated fashion at its upstream end about a second pivoting axis, may be inherently rigid and may also be coupled to the adjustment drive.

13 Claims, 4 Drawing Sheets

(56) References Cited

U.S. PATENT DOCUMENTS

| | | | | |
|---|---|---|---|---|
| 2011/0045884 A1* | 2/2011 | Weichholdt | ........ | A01D 41/1243 460/112 |
| 2011/0053669 A1* | 3/2011 | Weichholdt | ........ | A01D 41/1243 460/112 |
| 2014/0066146 A1* | 3/2014 | Dilts | ................. | A01D 41/1243 460/111 |
| 2014/0066148 A1* | 3/2014 | Dilts | ................. | A01D 41/1243 460/111 |
| 2015/0351322 A1* | 12/2015 | Desmet | ............. | A01D 41/1243 460/114 |
| 2016/0135377 A1* | 5/2016 | Ballegeer | .......... | A01D 41/1243 460/112 |
| 2017/0094902 A1* | 4/2017 | Reinecke | .......... | A01D 41/1243 |
| 2017/0265390 A1* | 9/2017 | Panoushek | ........ | A01D 41/1243 |
| 2018/0368319 A1* | 12/2018 | Desmet | ............... | A01D 41/1243 |
| 2019/0008091 A1* | 1/2019 | Isaac | ..................... | A01D 91/04 |
| 2019/0059218 A1* | 2/2019 | Rittershofer | ............ | A01F 29/04 |
| 2019/0124849 A1* | 5/2019 | Farley | .................... | A01F 12/40 |
| 2019/0261562 A1* | 8/2019 | Rittershofer | ............ | A01F 29/12 |
| 2019/0269071 A1* | 9/2019 | Dilts | ...................... | A01F 12/40 |

\* cited by examiner

ARRANGEMENT FOR SWITCHING A COMBINE HARVESTER BETWEEN A SWATH DEPOSIT MODE AND A WIDE DISTRIBUTION MODE

FIELD OF THE INVENTION

The invention relates to an arrangement for switching a combine harvester between swath deposit operation and wide distribution operation for residual harvested material.

BACKGROUND OF THE INVENTION

Agricultural combine harvesters are large machines which harvest, thresh, separate and clean agriculturally grown harvested material which bears grain. The obtained clean grain is stored in a grain tank which is arranged on the combine harvester. The threshed-out straw is generally either chopped and distributed on the field over the width of the cutting mechanism or is directed around the straw chopper or straw distributor and stored in a swath on the field, in order to be able to be picked up later with a bale press.

To switch between swath deposit operation and chopping operation, flaps are typically used in the prior art. These flaps are usually embodied as single-part elements (U.S. Pat. No. 4,056,107A) which are inherently flat or curved single-part elements (DE102008001460A1) which are inherently curved or bent.

The single-part flap produces, in its downward adjusted position, a relatively large deflection angle for the stream of material, which impedes the flow. A disadvantage of the curved or bent flap is that it also brings about downward deflection of the stream of material in the upper position, which deflection would basically not be necessary and also impedes the flow.

A two-part flap for switching over between swath deposit operation and wide distribution operation is described in EP3153001A1 which is considered to be genus-forming. This flap comprises a rear, inherently rigid element which is curved concavely in the material flow direction and is attached in an articulated fashion, so as to be pivotable at its upstream end, to the chassis of the combine harvester and a front element composed of inherently flexible material which is fastened at its upstream end to the chassis and bears with its upstream end on the rear element and is coupled thereto. The curvature radius of the front element changes accordingly when the rear element is pivoted, with the result that a relatively acutely angled transition of the flow of material onto the front end and from there onto the rear element is produced. However, during operation the front element will deform owing to the impacting stream of material. As a result, the intended, acutely angled deflection is virtually impossible, at least in the case of relatively large material throughput rates.

The problem addressed by the present invention is providing an arrangement for switching over a combine harvester between swath deposit operation and wide distribution operation which is improved compared to the prior art, and a combine harvester which is equipped therewith. This is an object of this invention.

SUMMARY OF THE INVENTION

In accordance with one aspect of the invention, and arrangement for switching over a combine harvester between swath deposition operation and wide distribution operation is provided that comprises a front element and a rear element which is arranged downstream of the front element with respect to a material flow direction of the residual harvested material, wherein the rear element is attached in an articulated fashion, in an inherently rigid fashion, at its upstream end about a first pivoting axis and can be moved between a swath deposit position and a wide distribution position by an articulated fashion outlet one end adjustment drive, and the front element is movable between a swath deposit position and a wide distribution position, and a combine harvester equipped therewith.

In accordance with another aspect of the invention, an arrangement for switching over a combine harvester between swath deposit operation and wide distribution operation is provided that comprises a front element and a rear element which is arranged downstream of the front element with respect to a material flow direction of the residual harvested material. The rear element is inherently rigid and is attached in an articulated fashion at its upstream end about a first pivoting axis and can be moved between a swath deposit position and a wide distribution position by an adjustment drive. The front element is movable between a swath deposit position and a wide distribution position. The front element is attached in an articulated fashion at its upstream end about a second pivoting axis, is inherently rigid and is coupled to the adjustment drive which can be an external-force-activated actuator or a manually adjustable operator control element.

A two-part arrangement is proposed which can be adjusted between a swath deposit position and a wide distribution position. The arrangement comprises two inherently rigid elements which are attached in an articulated fashion at their upstream end to the chassis of the combine harvester so as to be movable about corresponding pivoting axes. The elements are both coupled to an adjustment drive in order to move them respectively between the swath deposit position and the wide distribution position. In this way, there is no need for an inherently flexible element which can deform when there is a strong flow of material the present arrangement ensures that in a deflecting position a sufficiently gentle transition, which encloses only a relatively small deflection angle, takes place from the original flow direction of the residual harvested material onto the front element and from there onto the second element which follows downstream, and in a non-deflecting or less deflecting position the two elements enclose an even smaller angle with respect to one another and with respect to the original flow direction of the residual harvested material. It is therefore ensured that the residual harvested material flows without problems.

The front element can be coupled to the adjustment drive by a spring. This ensures that the rear end of the front element comes to bear on the rear element independent of possible tolerances and without gaps or the like, both in the swath deposit position and in the wide distribution position. The spring can be, for example, a helical spring or a gas pressure spring.

The front element and/or the rear element can be inherently flat even though they could also be inherently curved or bent.

The front element can be shorter than the rear element.

A linear actuator, which is coupled to the rear element by means of a first crank, may be used as the adjustment drive. However, it would also be possible to use a rotational actuator which is connected in a rotational-movement-transmitting fashion to the front and rear element. The abovementioned spring can be coupled at one end to the first crank and at the other end to a second crank which is connected to the front element.

The first crank can be coupled to a first shaft which can rotate about the first pivoting axis and to which the rear element is fastened. The second crank can also be coupled to a second shaft, which can rotate about the second pivoting axis and to which the front element is fastened.

The front element can be supported on the chassis by a gas pressure spring.

In the wide distribution position, the two elements can direct the residual harvested material into a straw chopper, which can be followed by a wide distribution device with passive guiding plates and/or active distributor blowers, and can guide the residual harvested material past it in swath deposit position. It would also be conceivable to dispense with the straw chopper and depend on the fact that a harvested material-processing device outputs the residual harvested material already in a sufficiently small form (or to arrange the straw chopper directly at the end of the harvested material-processing device or to integrate it therein) and to feed the residual harvested material in the wide distribution position to a distributor blower without a straw chopper.

The arrangement according to the invention is used in a combine harvester having a harvested material-processing device and an outlet for residual harvested material. The arrangement according to the invention is located downstream of the harvested material-processing device.

BRIEF DESCRIPTION OF THE DRAWINGS

An exemplary embodiment of the invention will be explained with reference to the Figures, in which.

DETAILED DESCRIPTION OF THE PREFERRED EMBODIMENTS

Figure 1:
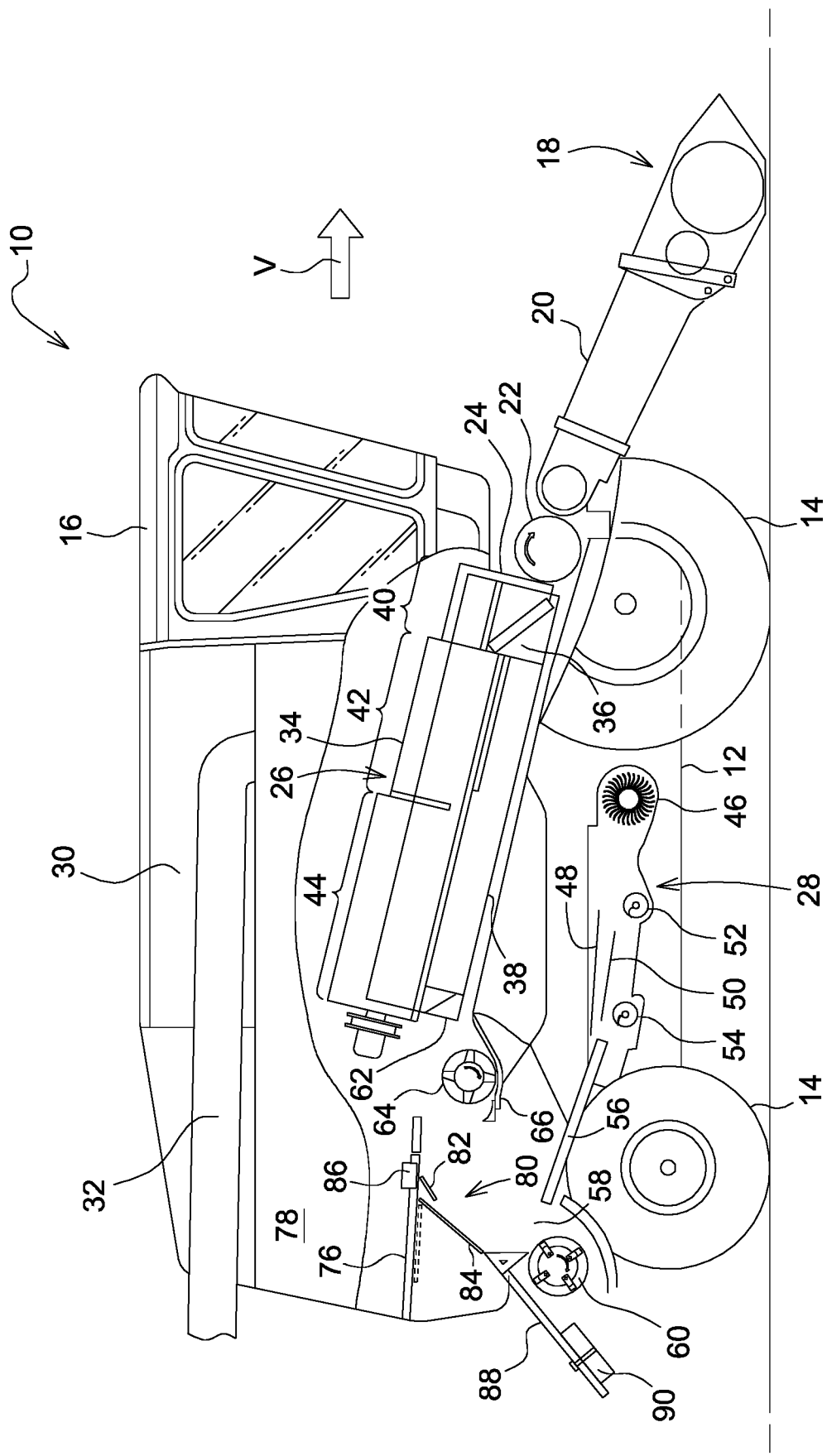
FIG. 1 shows a partially sectional lateral view of a combine harvester with an arrangement for switching over between swath deposit operation and wide distribution operation.

FIG. 1 shows an agricultural combine harvester 10 with a chassis 12 supported on wheels 14 which are in engagement with the ground. The wheels are fastened to the chassis 12 and serve to propel the combine harvester 10 in a forward direction. The forward direction runs to the right in FIG. 1. The operation of the combine harvester 10 is controlled from the operator cab 16. A cutting mechanism 18 is used to harvest grain which is contained in the harvested material and to feed it to an inclined conveyor 20. The harvested material is fed to a guide drum by the inclined conveyor 20. The guide drum 22 guides the harvested material through an inlet transition section 24 to an axial harvested material-processing device 26. In the text which follows, directional information, as at the front and at the rear, relates to the forward direction of the combine harvester 10.

The harvested material-processing device 26 comprises a rotor housing 34 and a rotor 36 which is arranged therein. The rotor 36 comprises a hollow drum 38, to which material-processing elements for a feed section 40, a threshing section 42 and a separating section 44 are fastened. The feed section 40 is arranged on the front side of the axial harvested material-processing device 26. The threshing section 42 and the separating section 44 are located downstream in the longitudinal direction and to the rear of the feed section 40. The drum 38 is in the form of a truncated cone in the feed section 40. The threshing section 42 comprises a front section in the form of a truncated cone and a cylindrical, rear section 44. The cylindrical separating section 44 of the drum 38 is located at the end of the axial harvested material-processing device 26. Instead of an axial harvested material-processing device 26, which can be also shaped in any desired fashion other than that illustrated, it is also possible to use a tangential threshing drum and an axial separating device or straw walker which follows it.

The grain and chaff fall through a threshing basket assigned to the threshing section 42 and a separating grate assigned to the separating section 44. The grain and chaff are then fed to a cleaning system 28 with a blower 46 and slotted sieves 48, 50 which can be made to move in an oscillating fashion. The cleaning system 28 removes the chaff and feeds the now-clean grain via an auger conveyor 52 to an elevator for clean grain (not shown). The elevator for clean grain places the clean grain in a grain tank 30. The clean grain in the grain tank 30 is then periodically discharged onto a grain wagon, trailer or truck by means of a discharge worm conveyor 32. Harvested material which has remained at the rear end of the lower slotted sieve 50 is fed again to the harvested material-processing device 26 by means of an auger conveyor 54 and a tailings conveyor (not shown). The residual harvested material which is output at the rear end of the upper slotted sieve 48 is composed essentially of chaff and small particles of straw. This residual harvested material Is then fed rearward into an inlet 58 of a straw chopper 60 by means of a vibratory pan conveyor 56.

Threshed straw leaving the separating section 44 is expelled from the harvested material-processing device 26 through an outlet 62 and fed to an ejector drum 64. The ejector drum 64 interacts with a pan 66 which is arranged underneath it and throws the straw out toward the rear. An upper wall 76 which extends horizontally and in the forward direction is mounted above the ejector drum 64 and adjoins in the downward direction an engine cavity 78 which is located above it.

Underneath the wall 76 there is an arrangement 80 for switching over between swath deposit operation and wide distribution operation. The arrangement 80 comprises a front element 82 (with respect to the flow direction of the residual harvested material) and a rear element 84 which is arranged downstream of the front element 82 with respect to the material flow direction of the residual harvested material.

The rear element 84 is inherently rigid and is attached in an articulated fashion in an inherently rigid fashion at its upstream end to the chassis 12 so as to be pivotable about a first pivoting axis and can be moved between a raised swath deposit position (shown by dashed lines in FIG. 1) and an adjustment drive 86, in which it extends flat underneath the wall 76, and a wide distribution position which is shown by continuous lines in FIG. 1 and in which it extends obliquely rearward and downward, in order to guide the residual harvested material into the inlet 58 of the straw chopper 60.

The front element 82 has a drive coupling to the rear element 84 and can be moved between a raised swath deposit position (shown by dashed lines in FIG. 1), in which it extends flat under the wall 76, and a wide distribution position which is shown by continuous lines in FIG. 1 and in which it extends obliquely rearward and downward (less steeply than the rear element 84) and bears with its rear end on the rear element 84, in order to guide the residual harvested material to the rear element 84 and from there into the inlet 58 of the straw chopper 60. The front element 82 is attached in an articulated fashion at its upstream end to the chassis 12 so as to be pivotable about a second pivoting axis, is inherently rigid and is coupled to the adjustment drive 86.

Underneath the lower and rear end of the rear element 84, a chute 88, which is fixedly connected to the chassis 12, adjoins in an uninterrupted fashion (when the rear element 84 is in the wide distribution position) and extends obliquely rearward and downward, and the straw can slide downward on said chute 88 onto the soil of the field during the swath deposit operation. The straw swath can also be given a desired shape by guide runners or straw guide rakes (not shown) which are attached to the upper side of the chute 88.

The straw chopper 60 comprises a rotor and a housing. The rotor is located inside the housing and can rotate about an axis which runs transversely with respect to the forward direction and horizontally. The rotor has chopping blades which are distributed around the circumference of the rotor and are suspended in a swinging fashion.

Two blowers 90 are provided downstream of an outlet of the straw chopper 60. These blowers are arranged laterally one next to the other underneath the chute 88. Only one of the blowers can be seen in FIG. 1.

The blowers 90 comprise a number of air vanes, which are each rigidly connected to a shaft which extends orthogonally with respect to the chute 88 and can be made to rotate by, in each case, a hydraulic motor or a mechanical drive train.

In the swath deposit position, the straw chopper 60 feeds only the residual harvested material from the cleaning system 28 to the blowers 90, which distribute approximately over the width of the cutting mechanism 18 on the soil of the field. Instead of the blowers 90, it is also possible to use a number of rigid straw guide plates which are arranged laterally one next to the other. These straw guide plates can be coupled to a driver that oscillates them to and fro.

Figure 2:
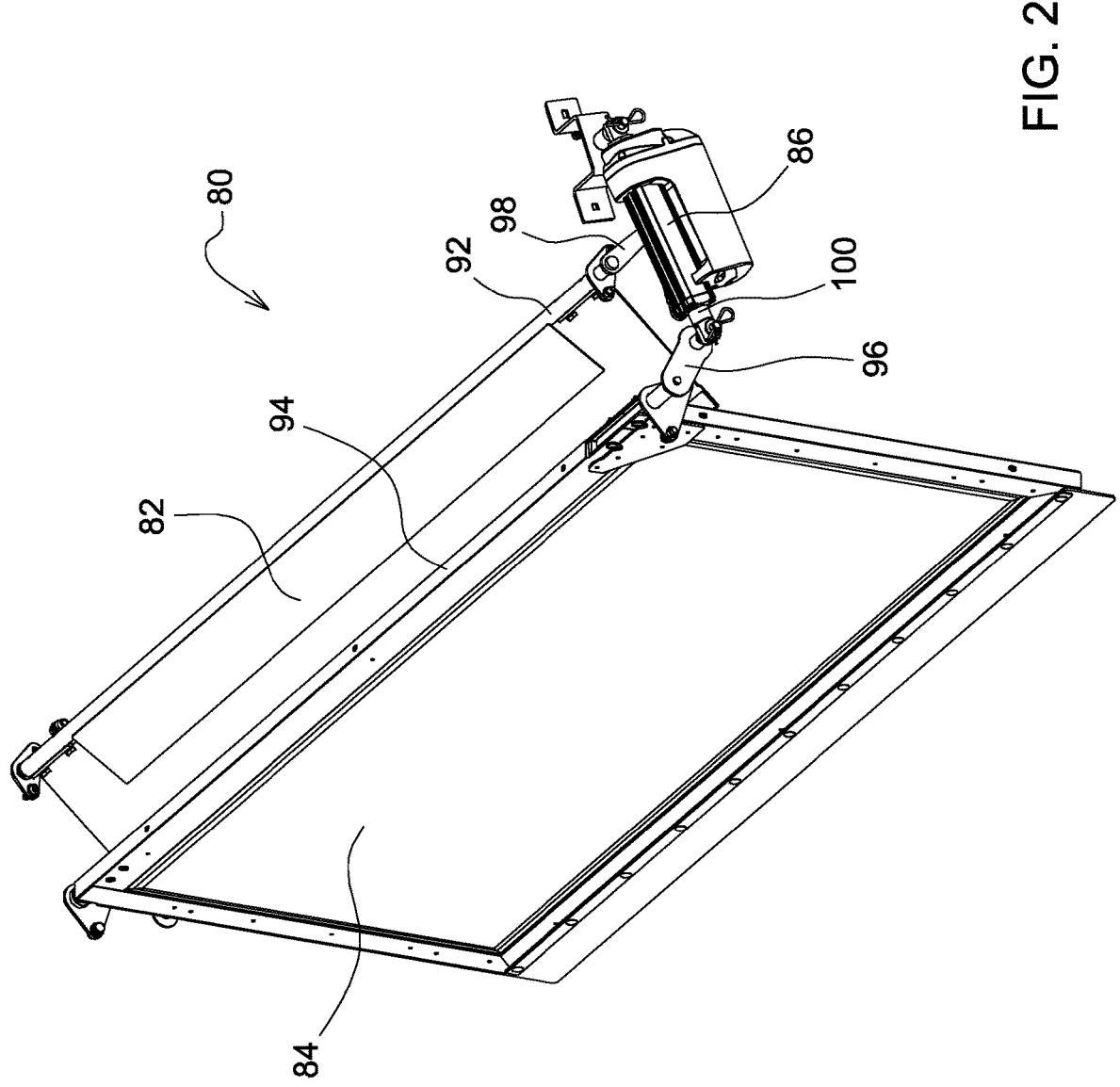
FIG. 2 shows a perspective view of the arrangement in the wide distribution position.
Figure 3:
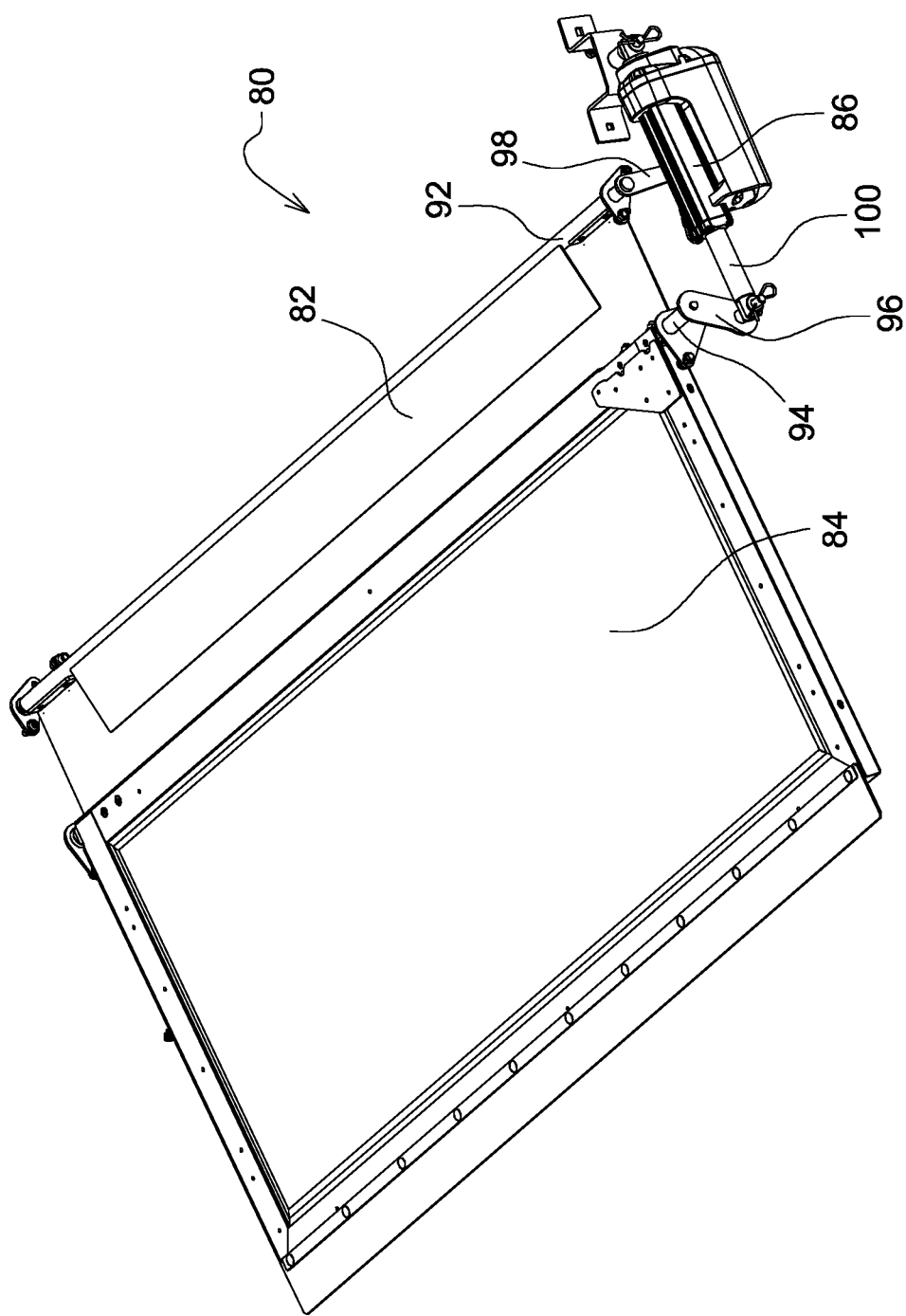
FIG. 3 shows a perspective view of the arrangement in the swath deposit position.

FIG. 2 shows the arrangement 80 in the wide distribution position, while the arrangement 80 is shown in the swath deposit position in FIG. 3.

The front element 82 is connected at its front end to a shaft 92. The shaft 92 extends horizontally and transversely with respect to the forward direction "V". The shaft 92 is rotatably supported on both sides of the front element 82 by bearing points on the chassis 12. The shaft 92 defines the abovementioned second pivoting axis. The shaft 92 is connected to a crank 98.

The rear element 84 is connected at its front end to a shaft 94. The shaft 94 extends horizontally and transversely with respect to the forward direction "V". The shaft 94 is rotatably supported on both sides of the rear element 84 by bearing points on the chassis 12. The shaft 94 defines the abovementioned first pivoting axis.

Figure 4:
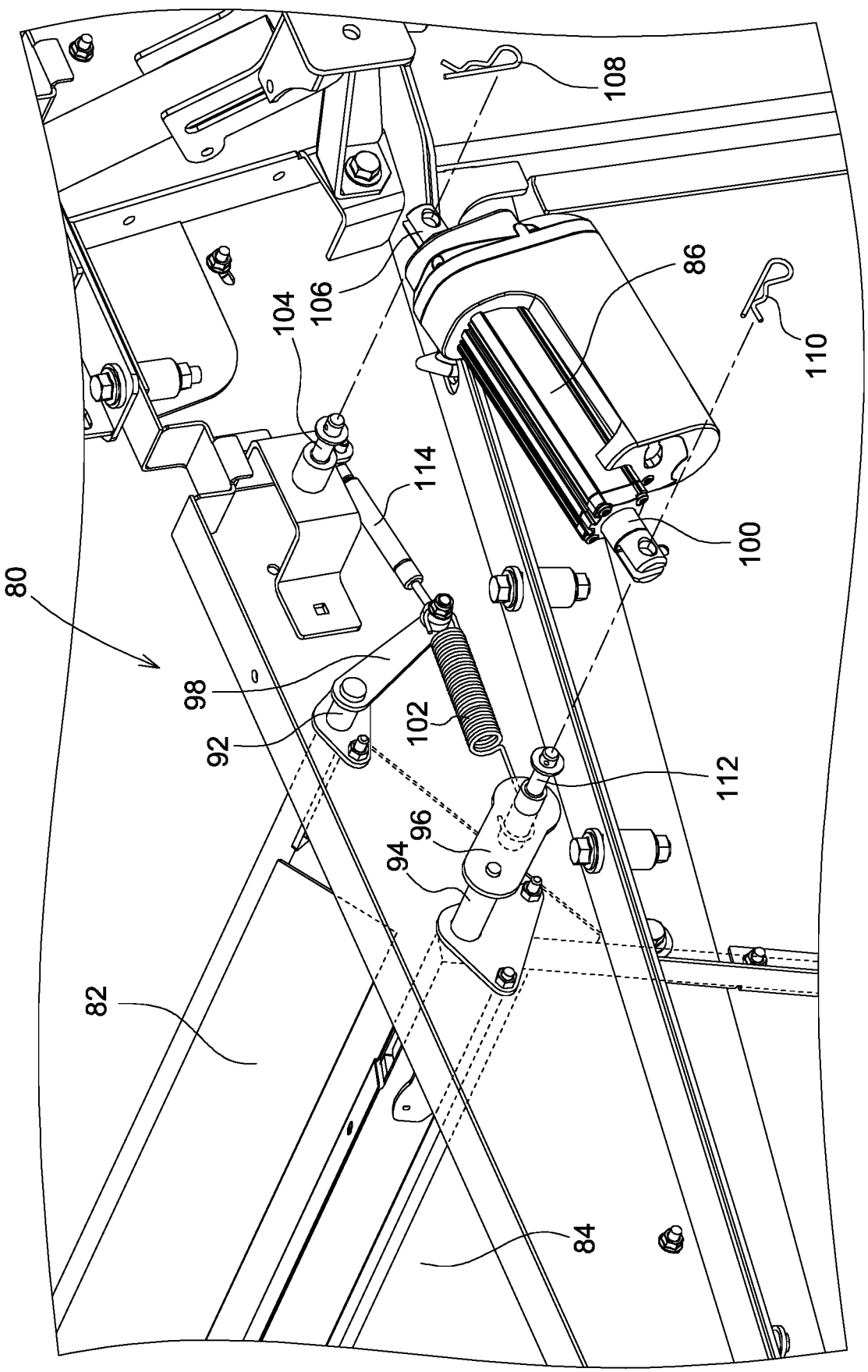
FIG. 4 shows an exploded, perspective view of the drive of the arrangement.

The shaft 94 is connected to a crank 96. The crank 96 is coupled to a slideable output element 100 of the adjustment drive 86, embodied as a linear actuator, so as to be rotatable about an axis which extends horizontally and transversely with respect to the forward direction "V", using an axle 112 and a retainer 110, as illustrated in FIG. 4. From FIGS. 2 and 3 it is apparent that in the swath deposit position the rear end of the front element 82 is located to the rear of the front edge of the rear element 84 and bears downward on the rear element 84, while in the wide distribution position the front element 82 bears with its rear, upper corner (in contrast to what is shown in FIG. 1) on the rear element 84.

FIG. 4 also shows that the housing of the adjustment drive 86 is connected by a bolt 106 to an axle 104 which is connected to the chassis 12, also using a retainer 108. The cranks 96 and 98 are connected to one another by means of a spring 102 which transmits tensile forces and compressive forces and is embodied here as a helical spring, although other embodiments would also be conceivable. A gas pressure spring 114 is attached in an articulated fashion with one end to the crank 98 and with the other end to the chassis, in the vicinity of the axle 104.

The spring 102 pulls the front element 82 upward (in the clockwise direction as shown in the Figures) when the adjustment drive 86 adjusts the rear element 84 from the wide distribution position into the swath deposit position, and pushes it downward (in the counter-clockwise direction in the Figures) when the adjustment drive 86 adjusts the rear element 84 from the swath deposit position into the wide distribution position. The front element 82 follows the force of the spring 102 as soon as the respectively acting forces become larger than the counteracting forces of the gas pressure spring 114. It is therefore ensured that in the swath deposit position and wide distribution position the front element 82 bears from below on the rear element 84, without an appreciable gap, and could penetrate through the residual harvested material and collect above the front element 82, even if tolerances were to be present in the adjustment mechanism.

In another arrangement, the gas pressure spring 114 can be eliminated. Further, the gas pressure spring 114 may be used instead of the spring 102, i.e. to couple it between the front and rear elements 82, 84.

The adjustment drive 86 can be activated from the cab 16 in order to adjust the arrangement 80 between the swath deposit position and the wide distribution position, and vice versa, depending on requirements. The adjustment drive 86 then moves the crank 96 and the rear element 84 via the shaft 94. The front element 82 is pivoted simultaneously by means of the spring 102 and the crank 98 and the shaft 92.

The description and Figures in this application are provided to illustrate at least one working embodiment of the claimed invention. Other arrangements are, of course, possible. People skilled in the art of agricultural combine design can readily create alternative arrangements that fall within the scope of the patent claims herein. The claims are therefore not limited to the specific embodiment/s mentioned or illustrated in this document.

The invention claimed is:

1. An arrangement for switching over a combine harvester between swath deposit operation and wide distribution operation, comprises a front element and a rear element which is arranged downstream of the front element with respect to a material flow direction of residual harvested material when the front element and the rear element operate in one of a swath deposit position and a wide distribution position, wherein the rear element is attached in an articulated fashion, in an inherently rigid fashion, at its upstream end about a first pivoting axis and can be moved between the swath deposit position and the wide distribution position by an adjustment drive, and the front element is movable between the swath deposit position and the wide distribution position, wherein the front element is attached in an articulated fashion at its upstream end about a second pivoting axis, is inherently rigid and is coupled to the adjustment drive.

2. The arrangement as claimed in claim 1, wherein the front element is coupled to the adjustment drive by a spring.

3. The arrangement as claimed in claim 2, wherein the spring is a gas pressure spring or a helical spring.

4. The arrangement as claimed in claim 1, wherein the front element or the rear element are inherently flat, and the front element is shorter than the rear element.

5. The arrangement as claimed in claim 1, wherein the adjustment drive is a linear actuator which is coupled to the rear element via a first crank.

6. The arrangement as claimed in claim 5, wherein a spring is coupled at one end to the first crank and at another end to a second crank which is connected to the front element.

7. The arrangement as claimed in claim 6, wherein the first crank is coupled to a first shaft which can rotate about the first pivoting axis and to which the rear element is fastened, and the second crank is coupled to a second shaft which can rotate about the second pivoting axis and to which the front element is fastened.

8. The arrangement as claimed in claim 2, wherein the front element is coupled to a gas pressure spring, one end of the gas pressure spring is supported at a chassis of the combine harvester.

9. The arrangement as claimed in claim 1, wherein the front element and the rear element direct residual harvested material into a straw chopper in the wide distribution position, and guide it past said straw chopper in the swath deposit position.

10. A combine harvester having a harvested material-processing device which has an outlet for residual harvested material, which harvested material-processing device is followed downstream by an arrangement as claimed in claim 1.

11. The arrangement as claimed in claim 1, wherein when the front element and the rear element operate in the wide distribution position, a rear end of the front element positioned adjacent to an upstream portion of the rear element.

12. The arrangement as claimed in claim 1, wherein when the front element and the rear element operate in the swath deposit position, a rear end of the front element is under the upstream end of the rear element.

13. The arrangement as claimed in claim 1, wherein the front element includes a front element guiding surface and the rear element includes a rear element guiding surface, the front element guiding surface and the rear element guiding surface cooperate to guide the material flow direction when the front element and the rear element operate in one of the swath deposit position and the wide distribution position.

\* \* \* \* \*